United States Patent [19]

Best et al.

[11] 4,035,615

[45] July 12, 1977

[54] SYSTEM FOR ACCEPTING WIDE RANGES OF UNIVERSAL PRODUCT CODE SYSTEM

[75] Inventors: Donald T. Best, Lafayette Hill; Juan M. Gottschalk, Elkins Park, both of Pa.

[73] Assignee: Sperry Rand Corporation, New York, N.Y.

[21] Appl. No.: 688,511

[22] Filed: May 20, 1976

[51] Int. Cl.² ............ G06K 7/10; G08C 9/06; G06K 9/18; H03K 9/08
[52] U.S. Cl. ............ 235/61.11 E; 250/555; 340/146.3 F; 329/106
[58] Field of Search ............ 235/61.11 E; 340/146.3 F, 146.3 Z; 250/555, 566, 568, 569; 329/106

[56] References Cited

U.S. PATENT DOCUMENTS

| | | | |
|---|---|---|---|
| 3,890,597 | 6/1975 | Hanchett | 235/61.11 E |
| 3,893,077 | 7/1975 | Myren | 340/146.3 F |
| 3,916,154 | 10/1975 | Hare et al. | 235/61.11 E |
| 4,000,397 | 12/1976 | Hebert et al. | 235/61.11 E |

Primary Examiner—Daryl W. Cook
Attorney, Agent, or Firm—Rene A. Kuypers

[57] ABSTRACT

The invention pertains to an optical scanning technique which is capable of reading and accepting a wide range of out-of-tolerance symbols. The technique provides that if a successful scan occurs, the signal circuits maintain a status that indicates a true signal is being processed. However, if an unsuccessful scan takes place the signal circuits introduce a distortion therein in order that the symbol may be read successfully.

7 Claims, 7 Drawing Figures

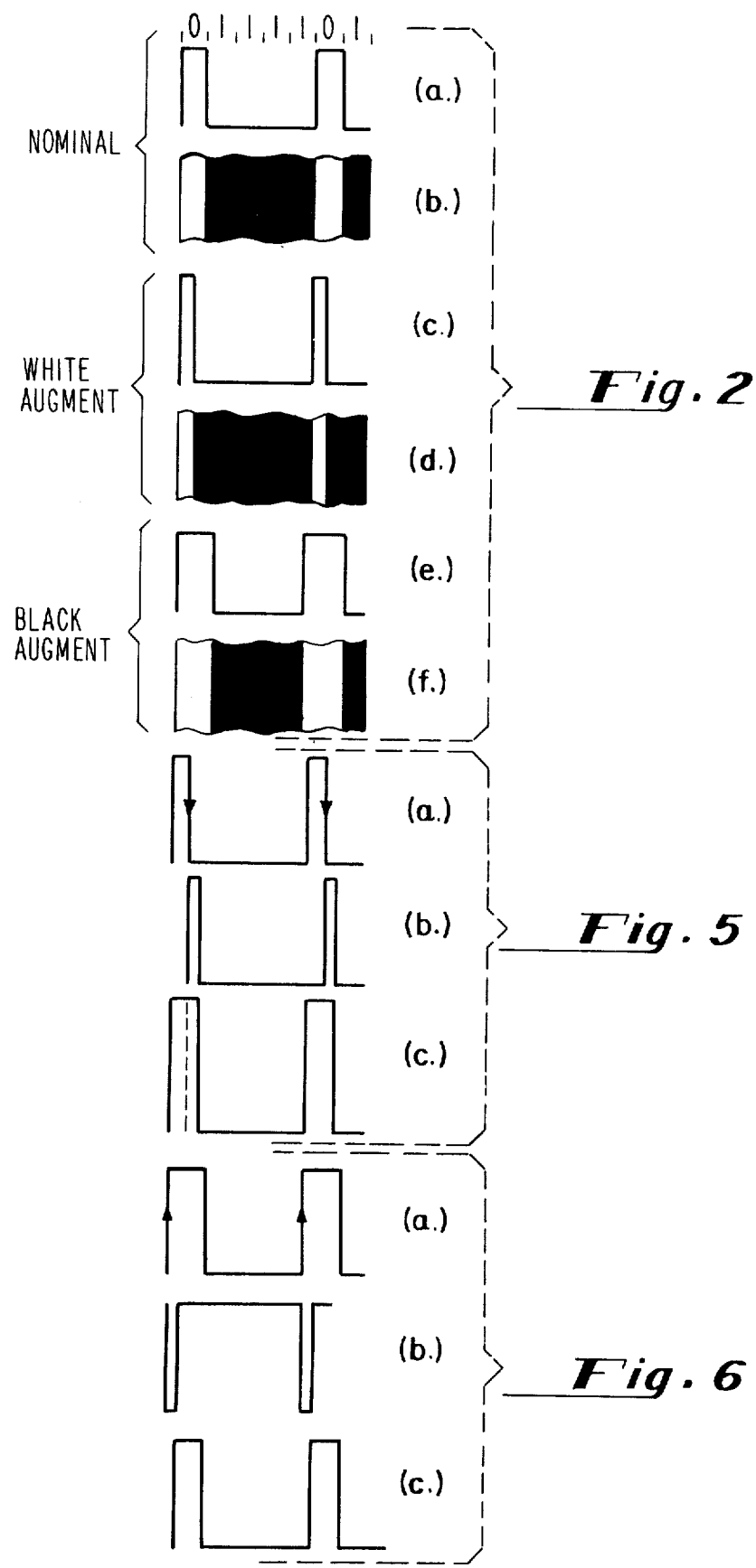

SYSTEM FOR ACCEPTING WIDE RANGES OF UNIVERSAL PRODUCT CODE SYSTEM

BACKGROUND OF THE INVENTION

Description of the Prior Art

In the known prior art of optical scanning of UPC (Universal Product Code) symbols, which are composed of alternating black and white bars to form a code, it is known that the nature of the optical scanning system which is utilized to read the code tended to discriminate against the white bars over the black bars. Accordingly, equalization circuits were utilized into the signal processing circuity to remedy this problem.

In a dissimilar art such as systems that read magnetic information on tape, it is well known that if the information cannot be properly read from the tape when the read circuits are at a nominal gain setting, the system will automatically switch to increase gain and a read cycle will again be tried. However, if too much noise is introduced into the read circuitry by the increased gain so that a read operation cannot be accomplished, then the gain is reduced to below nominal and a read cycle is again attempted. Hopefully, this third alternative permits a successful read to take place.

It is to be noted in the above magnetic read system that the different gains that are introduced are linear changes introduced into an amplifier as opposed to non-linear gains.

SUMMARY OF THE INVENTION

In the area of optical scanning of the UPC labels found on source-marked and store-marked grocery product, it sometimes occurs that the alternating black and white bars exceed the tolerances permitted by the Uniform Grocery Product Code Council, Inc. This problem makes scanning of the symbol impossible or difficult and makes for great inconvenience in the management and throughput of customers in a store.

The present invention permits successful scanning of these out-of-tolerance symbols by introducing purposeful, non-linear distortions into the processing circuits depending upon whether the light bars, or alternatively the dark bars are out of tolerance.

In addition, the invention performs the task of knowing when to apply the non-linear distortion. This is accomplished by having the circuit operate sequentially so that a read normal, a read undersize (i.e., white bars are undersized) mode and a read oversized (i.e., white bars are oversized) mode are performed if needed. If a read normal is performed by pulling the label over the scanner and it is successful the system will not sequence further having executed on a good label.

If the read normal step is not executed successfully, the system is already preconditioned to the read undersize mode. A deliberate distortion is introduced into the processing circuitry during this cycle which narrows the black bars and widens or augments the white bars.

The product label is again pulled over the scanner, and if indeed the problem were undersized white bars, a successful read will occur and there will be no further sequential advance and the system returns to the real normal mode. If the read was not successful, the system steps to the third mode.

The third mode introduces a deliberate distortion into the processing circuitry which widens or augments the black bars and narrows the white bars. This distortion will normally permit a successful read to occur.

In any event, whether the third mode is successful or not, the system automatically will return to the read normal mode. However, it is very likely that since the system has utilized the last of its options, all symbols will be scanned under on the the three modes. If there is no successful decode of the symbol, it indicates an improper label that cannot be read under any circumstance.

BRIEF DESCRIPTION OF THE DRAWINGS

FIG. 2 illustrates the wave forms resulting from the scanning of a UPC left hand "3" after digitization.

FIG. 5 illustrates the pulse relationship to accomplish white augmentation.

FIG. 6 illustrates the pulse relationship to accomplish black augmentation.

DESCRIPTION OF THE PREFERRED EMBODIMENT

Figure 1:
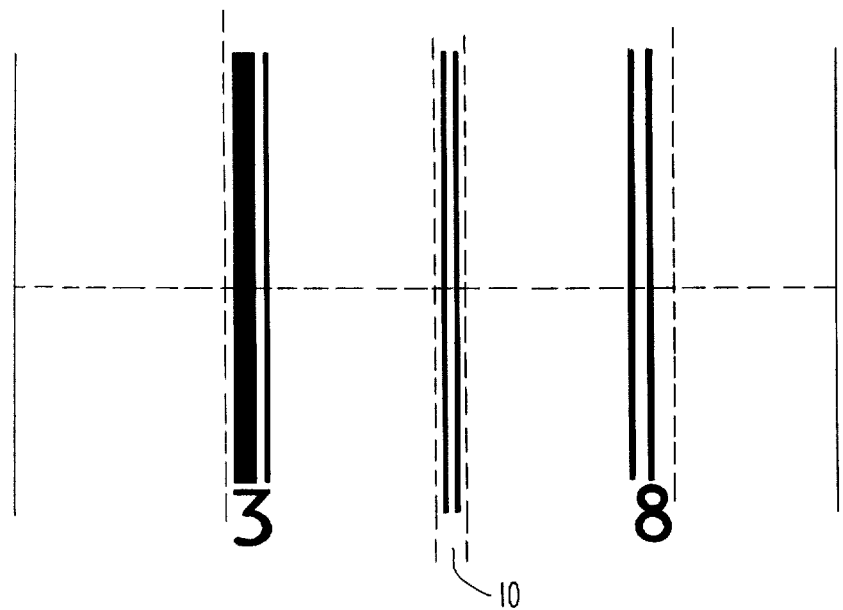
FIG. 1 depicts a portion of the UPC Grocery code and FIG. 1 (a) shows several UPC characters in greater detail.

Referring now in greater detail to FIG. 1, there is shown the machine-readable representation or symbol of the Grocery Industry Universal Product Code (UPC). This code numbering system adopted for the grocery industry consists of ten numeric characters although the code may be modified to facilitate compatability in other industries.

The standard symbol is in the form of a series of parallel light and dark bars of different widths and is sometimes referred to as a bar code symbol. As can be seen in FIG. 1 the overall shape of the symbol is rectangular and is composed essentially of black bars and white spaces. The center 10 of the symbol is represented by two equal width bars which is separated and flanked by equal width white spaces. Ten numeric characters are arranged so that five are positioned to the left of the center pattern 10, and five to the right thereof. Of these ten characters only two are shown in FIG. 1, namely, the characters 3 and 8 on the left and right side of center pattern 10, respectively. Additional coding is provided on the extreme left and right hand side numerics which are called the left and right hand guard bar patterns (not shown). It should be noted that some of the white and black bars are of different widths in the example shown. The reason for this will be discussed immediately below.

Figure 1A:
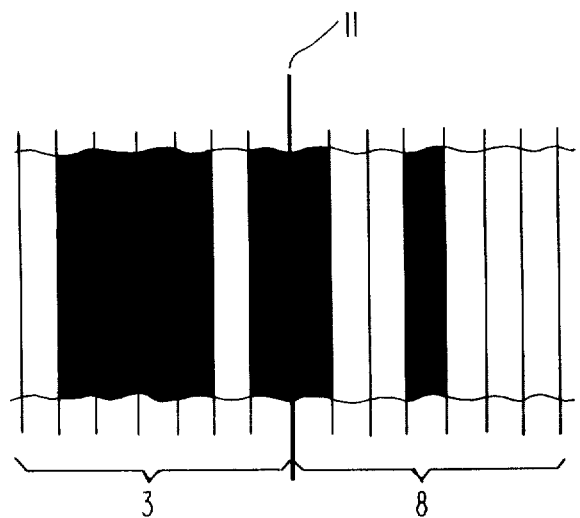

Each character of the UPC symbol is made up of seven data or binary elements as can be appreciated by referring to FIG. 1a. Each character is made up of a series of white and black bars wherein a white bar represents a binary zero and a black bar represents a binary one. Thus, the character to the left of the divider line 11 represents a "left-hand three" (encoded as 0111101), and the character to the right of the divider 11 represents a "right hand eight" (encoded 1001000). The designation of "left" and "right" indicates that a numeric assumes a different encoding depending upon whether it is located to the left or right of the center pattern 10 (see FIG. 1).

It is well recognized by those skilled in the art that if the black bars and white spaces are printed too wide or too narrow a systematic error will be introduced during the reading of the UPC symbol. The one condition mentioned above, namely, that the black bars are printed too wide occurs when the printer fails to compensate for ink spreading, and the second condition (black bars too narrow) over-compensates. Optical scanners can normally accommodate a wide range of tolerances, but even so many symbols cannot be scanned by existing scanners when they are too far out of tolerance. The method and apparatus for solving this particular problem is discussed below.

Figure 4:
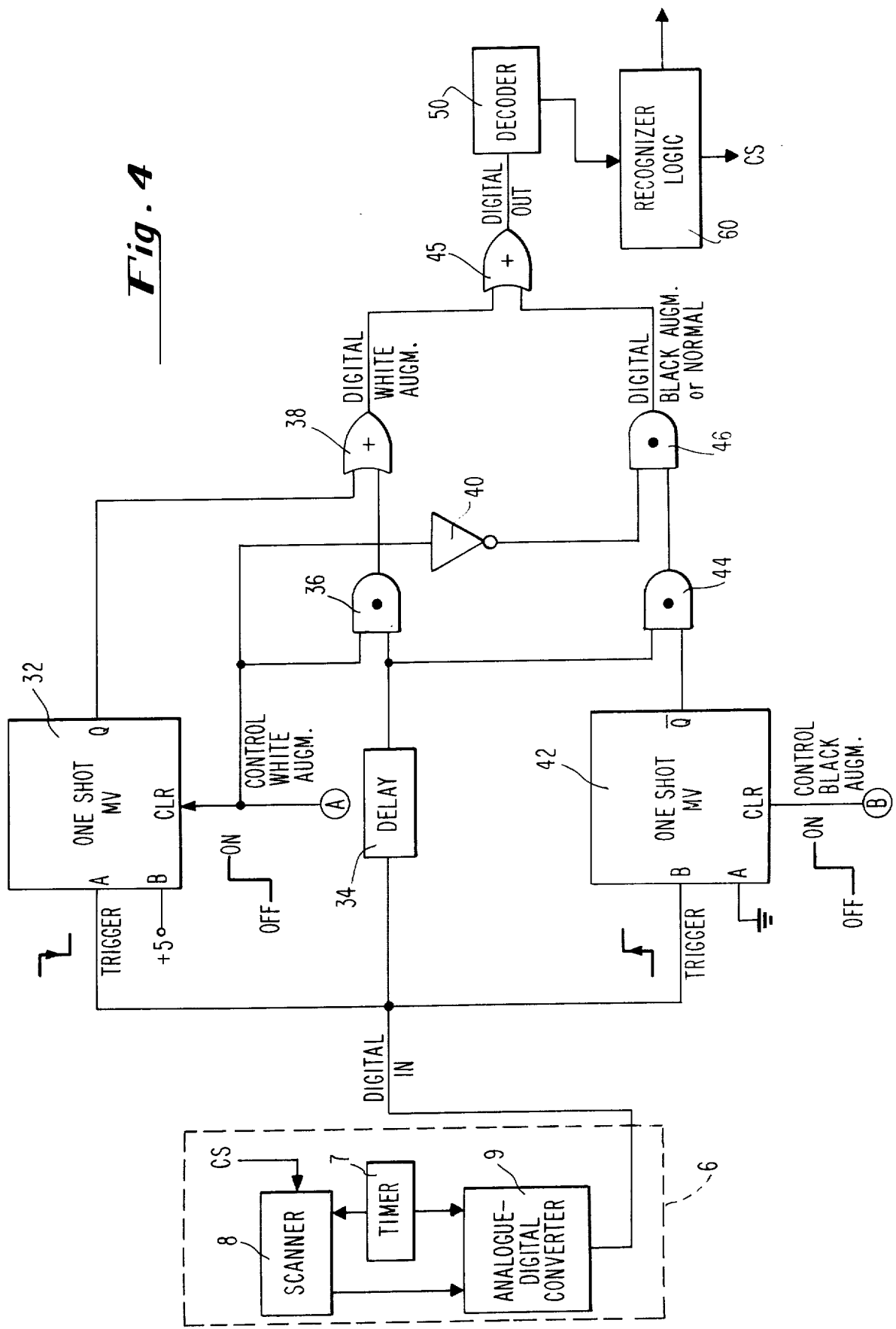
FIG. 4 shows the augmentation circuitry which is utilized with the control circuitry of FIG. 3.

Referring now to FIG. 4, there is depicted the signal processing unit 6 comprising the laser optical X scanner 8 whose output is directed into the analogue to digital converter 9. The converter 9 receives the analogue signals from the scanner 8 which digitizes these signals preparatory to being acted upon by the associated logic circuitry. The laser optical X scanning apparatus may be of the type shown in U.S. Pat. No. 3,818,444.

FIG. 2a illustrates the wave form resulting from digitization by converter 9 (FIG. 4) after the scanner 8 has read the portion of the nominal or within tolerance label (only a left hand 3 being depicted) of FIG. 2b. The positive polarity pulse represents a white space, whereas a negative or ground potential pulse represents a black bar.

Figure 3:
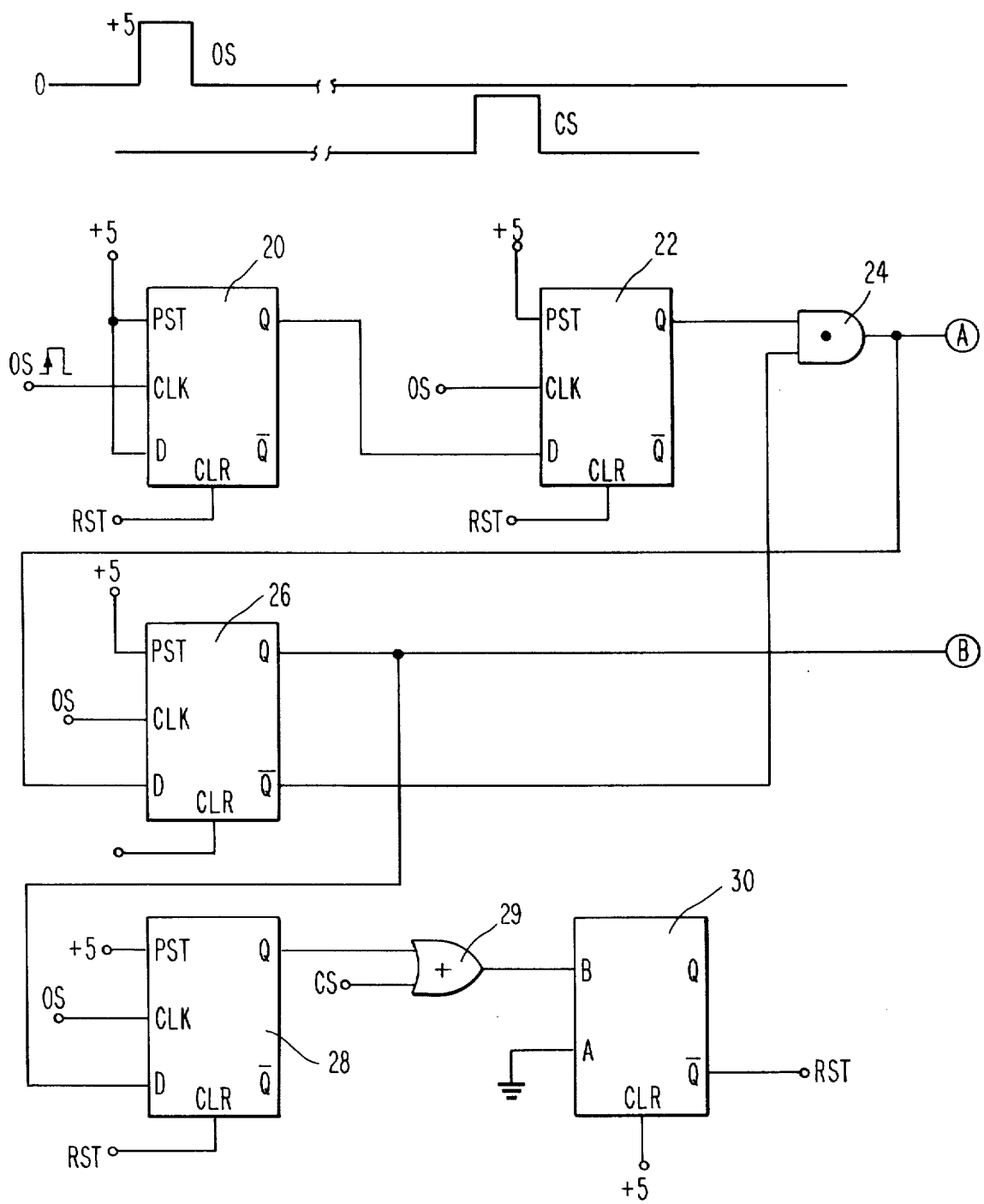
FIG. 3 depicts the three mode automatic equalization control circuitry.

Previous to the read normal mode of operation by the scanner, the flip-flops 20, 22, 26, 28 shown in FIG. 3 are all cleared. In the cleared state the Q and Q̄ outputs are low (L) and high (H), respectively. The flip-flops 20, 22, 26 and 28 are of the 7474 J-K type and retriggerable monostable multivibrator 30 is of the 74123 type made by the Texas Instrument Corporation. The flip-flops 20, 22, 26 and 28 require that their inputs be in a certain state prior to causing the Q output to revert to the H or set state. Thus, the flip-flops require in order to be set that simultaneous +5 volt signals be applied to the input terminals PST and D, and a negative to positive going signal transistion be applied to the CLK terminal. This setting or enabling of the flip-flop causes the Q and Q̄ terminal to become H and L, respectively. It should be noted hereat that the enabling of the flip-flop causes a delay of approximately 15 nanoseconds. In other words, this delay occurs from the time that the signals are applied to terminals PST, CLK and D to the time that a H level signal appears at the Q terminal.

The retriggerable multivibrator has a pulse duration of 1 millisecond and is enabled by a positive +5 volts applied to its input terminal B. Terminal A is always at ground potential. The CLR terminal always has a +5 volt signal applied thereto, however, it does not affect the circuit operation. When multivibrator 30 is triggered by a +5 volt applied to terminal B, terminal Q̄ goes L.

The AND gates utilized in the circuitry of this invention are of the positive type thereby requiring both input terminals to have position input signals to produce a positive output signal. In like manner, the OR gates or buffers are of the positive type, which require either input to be positive in order to obtain a positive output signal.

The signals utilized to operate the control circuitry of FIG. 3 are shown in pulse form above the circuit blocks. The +5 signal represents the open shutter (OS) pulse and is generated when the grocery item is drawn across an infra red beam of light (not shown) which causes the shutter to open so that the laser beam can scan the label. If a successful reading of the label occurs the circuitry 60 (FIG. 4) sends a close shutter (CS) signal back to the scanning circuit which closes the shutter. The CS signal therefore indicates that a successful read or decoding of the label has taken place. For purposes of discussion, this is deemed mode 1 of the operation. If the label is not successfully decoded, the shutter closes after a period of two seconds has elapsed from the breaking of the infra red beam. This function is performed by a monostable multivibrator in the timer 7 which is of the 74123 type. In other words, no CS signal is generated.

An OS signal is generated the next time that a read is attempted by breaking the infra red beam after the control circuitry is preconditioned to mode 2. This starts the white enhancement or read undersize mode (FIG. 2c, d). In this read mode the black bars are assumed to be oversized. Now when the item is brought across the light beam for a second time the OS signal is again generated. In the second mode, a distortion is introduced into the read-out signal of the label which widens the white spaces and narrows the black spaces to bring the symbol back within tolerance. Hence, this cycle of operation is identified as the white augment mode. If a successful decode of the label now takes place a CS signal will be generated and the system will be ready to read the next grocery item.

If the item is scanned for the second time and no CS signal was produced by the white augmentation, the system is preconditioned to mode 3. In the third mode, the infra red beam is again broken by the item being drawn across it so that another OS is generated. In this mode, the system is preconditioned to read a label in which the printing is defective because the white spaces are too wide and the black bars are too narrow. The system rectifies this aberration by substracting from the width of the white spaces and increasing the width of the black bars. Hence this mode is referred to as black augmentation.

Referring to FIG. 3 in greater detail, the generating of the OS signal by drawing the item across the infra red light beam sets flip-flop 20 on its positive going leading edge. This causes terminal Q to go H and Q̄ to go L. The Q output is applied to the D terminal of flip-flop 22. Flip-flop 22 is not set by this action of flip-flop 20 because there is approximately a 15 nanosecond delay in the enabling of flip-flop 20 as mentioned above. In other words, flip-flop 22 is not set because the +5 volts on terminal D is not present when the OS signal is present on terminal CLK and +5 volts is present on the PST terminal. Therefore, since the Q output from flip-flop 22 is L the positive AND gate 24 is not permissed and terminal Ⓐ is L. Furthermore, because the output of terminal Ⓐ is L and signal OS has already passed, the flip-flop 26 remains in the reset state so that its Q output or terminal Ⓑ is L. The state of terminals Ⓐ and Ⓑ represent signals for controlling the circuit operation shown in FIG. 4.

The control signal on the Ⓐ terminal is applied to a one-shot multivibrator 32, whereas the control signal output on the Ⓑ terminal is applied to the one-shot multivibrator 42. The multivibrators are of the type 74123. In any event, when terminals Ⓐ and Ⓑ are both L the multivibrators 32, 42 are not enabled and the Q̄ output of multivibrator 42 is H whereas the Q output of multivibrator 32 is L. The H output signal of multivibrator 42 is applied to the AND gate 44. The L output of terminal Q of multivibrator 32 is applied to one input of the OR gate 38. The second input to the OR gate 38 is the L output of the AND gate 36, which is not enabled because the signal on terminal Ⓐ is L. The second input to the AND gate 44 comprises the digitized signal from the output of the signal processing circuit 6 (FIG. 4) via delay 34, which is of the type 74L04. Since the read-out signal (FIG. 2a) is a combination of H and L pulses wherein the white spaces produce H signals and the black bars produce L or ground signals, the AND gate 44 will be conditioned by the H signals and not conditioned by the L signals. Consequently, the entire read-out signal which is a combination of H's and L's will be transmitted to the AND gate 44 and thence to the input of AND gate 46. The second input into the AND gate 46 originates at the clear terminal of the multivibrator 32 which is L. This L signal is inverted to H by the inverter 40 which is applied as the second input to the AND gate 46. Therefore, the AND gate 46 is conditioned by the positive pulses shown in FIG. 2a and blocked by the negative signals so that the entire pulse train from the read of the UPC label is outputted to the OR gate 45.

The output of the OR gate 45 passes into the decoder 50 and into the recognizer logic 60. If a successful decoding of the signal occurs and it is recognized by the logic 60, a CS signal is produced so the scanner shutter is closed and the system is ready to scan the next UPC label. It should be noted that the recognizer logic may be designed by those skilled in the art in accordance with the teachings set forth in the publication "The Characteristics and Decodability of the Universal Product Code Symbol", IBM Systems Journal, Vol. 14, No. 1, 1975, p. 61.

On the other hand, if the decoder cannot successfully decode the digitized signal emanating from the OR gate 45, it will not generate the CS signal and the shutter will close after 2 seconds. This two second time-out is produced in the scanner circuitry for that reason that the laser beam is only allowed to be on for a certain amount of time for safety purposes such as to prevent excessive radiation to persons in the immediate vicinity of the beam.

The CS signal is applied to the OR gate 29 (FIG. 3) whose output is connected to the input terminal B of multivibrator 30 which produces the reset (RST pulse) when it is enabled. The RST signal is applied to the clear terminals of the flip-flops 20, 22, 26 and 28. Therefore, the control circuitry is ready to operate on the next label being read.

Let us assume the condition that the scan of the item above discussed did not produce a successful read of the label through the recognition circuitry so that a CS signal was not produced. As will be recalled, if the scanning does not produce a successful read, the CS signal is not produced. Since a CS signal was not produced to indicate that a successful scan had occured, the reset signal (RST) also was not generated. Therefore, the flip-flops 20, 22, 26 and 28 were not reset. Hence, the flip-flop 20 is still enabled and the output terminal Q is H and is applied to terminal D of the flip-flop 22. Flip-flop 22 is therefore preconditioned to operate in the next mode.

Because the first scan was not successful the label is again drawn so as to break the infra red beam which causes the scanner shutter to open and a second OS signal is produced. The laser beam therefore generates an analog signal which is digitized by circuit 9 for operation in the second mode. As the label is transported across the scanning device for a second time the flip-flop 22 now also becomes set on the positive transition of the second OS signal. This results from the fact that the positive output signal is applied to the D terminal of the previously set flip-flop 20 and the +5 voltage from the pre-set signal which is applied to its PST terminal. At this point in time therefore both flip-flops 20 and 22 are in the set condition and the Q output of flip-flops 22 is applied to one of the inputs of AND gate 24. The flip-flop 26 is not set at this time because no signal was applied at its input terminal D during the positive transition of the signal OS applied to its clock input. Accordingly, the Q̄ output of flip-flop 26 is H and is the second H input to the AND gate 24 and, therefore, the output of the control signal Ⓐ reverts to the H state. Control signal Ⓑ which is connected to the Q terminal of flip-flop 26 is L because as previously mentioned it is not set.

In summary, during the second mode of operation of the system the control terminals Ⓐ and Ⓑ are H and L, respectively.

Referring now to FIG. 4 it can be seen that the control level Ⓐ is applied to the clear terminal of multivibrator 32, and the control level Ⓑ is applied to the clear terminal of multivibrator 42. It is illustrated also on FIG. 4 that the multivibrator 32 is enabled by a positive to negative going trigger signal, whereas multivibrator 42 is enabled by a negative to positive going trigger. The multivibrator 32 also requires a +5 volt signal applied to input terminal B, whereas multivibrator 42 requires a ground signal applied to input terminal A.

For purposes of discussion, let it now be assumed that the digitized signals emanating from the analogue/digital converter 9 are in the form shown in FIG. 2c. As can be appreciated from viewing FIG. 2d, the white spaces of the label are undersized, whereas the black bars are oversized. This in turn affects the positive pulse which is too narrow and the negative or ground signal which is too wide.

When the multivibrator 32 is enabled by the control signal Ⓐ going from L to H, the terminal Q produces a positive output pulse for every positive to negative trigger of a pulse trains (i.e., 2 triggers in FIG. 2c) which is fed into the OR gate 38. The multivibrator 32 is of the adjustable type so that the width of the generated pulse may be set to some predetermined value.

The digitized signal (FIG. 2c) from the signal processor 6 proceeds into the delay line 34 from whence it is inputted to the AND gate 36. The signal also inputs into multivibrator 32. Multivibrator 42 is not enabled at this time because control signal Ⓑ is L. The second input to the AND gate 36 is the H signal from the Ⓐ terminal of the control signal (FIG. 3) so that this gate is permissed and the pulse shown in FIG. 2c and duplicated in 5a is transmitted to the input of the OR gate 38. The output of the multivibrator 32 (FIG. 5b) is buffed together with the output of the AND gate 36. However, since the multivibrator 32 is triggered on the trailing edge it is clear that the output Q (FIG. 5b) of the multivibrator 32 occurs later in time than the pulse shown in FIG. 5a. In effect, therefore, the buffer 38 adds together the output of FIGS. 5a and 5b to produce the output 5c. The overall effect of this additional operation is to widen the white spaces and narrow the black bars. In other words, the separation between the two pulses in FIG. 5c which represents the black bar is narrowed, whereas the two pulses which represent the white spaces has been widened. It can therefore be appreciated that if the label has the condition wherein the printers ink has caused the black bars of the UPC label to exceed its allowed tolerance, mode 2 of this invention will cause the white spaces in effect to widen thereby in effect decreasing the width of the black bars. This is the reason that mode 2 is designated as the white augment mode (FIG. 2c, d). It should be noted that the digitized signal from the scanner is delayed in the preferred embodiment by the delay unit 34 by 30 nanoseconds in order to prevent a "glitch" (shown by the dotted line of FIG. 5c) appearing when adding the two signals in FIG. 5a and 5b. A "glitch" is a hiatus caused when the two signals of FIGS. 5(a) and (b) are not perfectly juxtaposed. The signal after addition shown in FIG. 5c results in the nominal signal of FIG. 2a.

After the white augmentation process has taken place as above described the modified digital signal from the scanner enters the input terminal of the OR gate 45 and is outputted to the decoder 50 and recognition circuit 60. The decoder 50 decodes the modified signal which is directed into the recognizer circuit 60. If a successful read or recognition takes place a CS signal is produced wich closes the shutter of the laser scanner and this signal is fed into the buffer 29 (FIG. 3). The output of the buffer 29 is fed into the input terminal B of the multivibrator 30, which is enabled and produces the reset signal RST. The RST signal is utilized to reset filp-flops 20, 22, 26 and 28. The system is then ready to read the next label. On the other hand if the decoder 50 and recognizer circuit 60 was not able to produce a successful read, the CS signal is not produced and the shutter will close after two seconds.

If pulse CS signal was not produced by the recognizer circuit 60 and the shutter had timed out after two seconds, there was no CS signal produced so that both flip-flop 20 and 22 remained in the set condition whereas flip-flops 26, 28, and 30 remained in the reset state. Therefore, the system is preconditioned to operate in the next mode. In this case, scanning of the label is again initiated by the breaking of a light beam and another OS is generated thereby opening the scanner shutter. The output of the AND gate 24 is still H since flip-flops 20, 22 remain set and this signal is applied to the input terminal D of the flip-flop 26. The +5 volts is also applied to the preset terminal (PST) so that the positive transition of the OS signal causes the flip-flop 26 to be set causing the output terminal Q to go H and Q̄ to go L. When Q̄ goes L the AND gate 24 is no longer permissed and control terminal Ⓐ reverts to the L state. On the other hand, the output Q of flip-flop 26 goes H and in turn causes the control terminal Ⓑ to go H.

The L signal from control terminal Ⓐ applied to the clear terminal of multivibrator 32 prevents this circuit from being enabled, whereas the H signal of control terminal Ⓑ applied to the clear terminal of multivibrator 42 enables the latter when the positive going leading edge of a trigger signal (FIG. 6a) is applied to terminal B. The Q̄ output of enabled multivibrator 42, which is L, is shown in FIG. 6b and is applied as one of the input signals to the AND gate 44. The second input to the AND gate 44 is the digitized signal (FIG. 6a) resulting from the laser scan of the label after being delayed by unit 34. As can be seen from FIG. 6a and b the AND gate 44 will only be conditioned when both inputs are H and will not be permissed when one of the inputs or both inputs are L. In effect, therefore, the width of the pulse in FIG. 6b is subtracted from the pulses of FIG. 6a. The result of the subtraction is the output of AND gate 44 and is shown in FIG. 6c.

The output of AND gate 44 is applied as one of the inputs to the AND gate 46. The second input to the AND gate 46 is H since the control signal on terminal Ⓐ applied to the clear terminal of the multivibrator 32 is L but becomes H after passing through the inverter 40. Therefore, the pulse train of FIG. 6c is passed through AND gate 46 and is outputted to the decoder 50 after passing through the OR gate 45.

As can be appreciated the operation of the circuitry just described in effect narrows the white spaces represented by the positive pulses of FIGS. 6a widens the black bars represented by the space between the positive pulses. Accordingly, the resulting signal will appear nominal as in FIG. 2a to the decoder 50.

The decoder 50 will therefore decode the digitized pulses and the recognizer circuit 60 will properly read the decoder signal and will produce the pulse CS. The output of the circuit 60 is also outputted to the circuits of the system.

It is likely that the UPC symbol will now be successfully decoded since all of the three options have now been utilized. As previously described if the CS signal is produced it will generate the reset signal RST by enabling the multivibrator 30 via the OR gate 29. Accordingly, flip-flops 20, 22, 24, 26 and 28 will all be reset by applying the reset pulse to their respective clear terminals.

Let us assume for the moment that by utilizing the third option or mode that a successful decode and read still cannot be obtained because of a bad label. In such a situation it should be recalled that flip-flops 20, 22, and 26 have all been set and remain in this state. Therefore the next OS signal is generated by breaking the light beam by passing the grocery item through it. Since input D is H because flip-flop 26 is set, flip-flop 28 will also become set since all inputs are present. The setting of flip-flop 28 causes output Q to go H which is inputted to the OR gate 29. The output of OR gate 29 is applied to terminal B of the multivibrator 30 which is enabled thereby. The negative Q̄ output is the reset signal RST which causes all of the flip-flops 20, 22, 26 and 28 to become reset. In this case the next item is ready to be read.

What is claimed is:
1. Scanning apparatus comprising:
    a. means for scanning a symbol comprising bars and spaces and for generating signals corresponding to said bars and spaces,
    b. means coupled to said scanning means for processing said signals, and
    c. means included in said processing means for widening said signals representing said spaces and narrowing said signals representing said bars and,
    d. means included in said processing means for narrowing the signals representing said spaces and widening the signals representing said bars.

2. The apparatus in accordance with claim 1 wherein said scanning means is optical.

3. The apparatus in accordance with claim 1 wherein said symbol formed of a group of indicia and spaces comprises bars and spaces which are arranged to form a code.

4. The apparatus in accordance with claim 3 wherein additional means are provided for decoding said code.

5. The method of reading a symbol comprising bars and spaces with a scanner device comprising,
   a. scanning said symbol by means of said scanner device in a first mode, said scanning thereby producing a read signal;
   b. producing a first signal indicative of the success of decoding said symbol, and not producing said first signal upon failure to decode said symbol,
   c. scanning said symbol again upon failure to successfully decode said symbol in a second mode;
   d. causing a distortion to be applied to said read signal equivalent to narrowing said bars and widening said spaces; and
   e. producing said first signal upon said distortion producing a successful decoding of said symbol, and not producing said first signal upon failure to successfully decode said symbol,
   f. scanning said symbol again upon failure to decode said symbol successfully in a third mode, said third scanning causing a distortion to be applied to said read signal equivalent to widening said bars and narrowing said spaces; and
   g. producing said first signal upon the last mentioned distortion producing a successful decoding of said symbol, whereby said scanner is ready to read a different symbol.

6. The method in accordance with claim 5 wherein said distortion is characterized by being non-linear.

7. The method in accordance with claim 6 including the step of,
   a. automatically returning to the first mode of operation upon failure to produce said first signal.

* * * * *